United States Patent
MacKinnon et al.

(10) Patent No.: US 11,062,548 B2
(45) Date of Patent: *Jul. 13, 2021

(54) CARD READER TAMPERING DETECTOR

(71) Applicants: Robert Bruce MacKinnon, North York (CA); Dmitri Rabinovich, Richmond Hill (CA)

(72) Inventors: Robert Bruce MacKinnon, North York (CA); Dmitri Rabinovich, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,868

(22) Filed: Oct. 21, 2019

(65) Prior Publication Data

US 2020/0051362 A1   Feb. 13, 2020

Related U.S. Application Data

(63) Continuation of application No. 15/982,963, filed on May 17, 2018, now Pat. No. 10,497,199.

(Continued)

(51) Int. Cl.
| | |
|---|---|
| *G08B 13/14* | (2006.01) |
| *G07F 9/02* | (2006.01) |
| *G08B 13/06* | (2006.01) |
| *G06F 21/57* | (2013.01) |
| *G06F 21/86* | (2013.01) |
| *G07F 19/00* | (2006.01) |
| *G07F 7/08* | (2006.01) |
| *G06F 21/44* | (2013.01) |
| *H04K 3/00* | (2006.01) |

(52) U.S. Cl.
CPC ............ *G07F 9/02* (2013.01); *G06F 21/44* (2013.01); *G06F 21/577* (2013.01); *G06F 21/86* (2013.01); *G07F 7/0873* (2013.01); *G07F 19/2055* (2013.01); *G08B 13/06* (2013.01); *H04K 3/822* (2013.01); *H04K 2203/20* (2013.01)

(58) Field of Classification Search
CPC ...... G07F 9/02; G07F 7/0873; G07F 19/2055; G06F 21/44; G06F 21/577; G06F 21/86; G08B 13/06; H04K 3/822; H04K 2203/20
USPC ...................................................... 340/568.7
See application file for complete search history.

(56) References Cited

U.S. PATENT DOCUMENTS

| | | | | |
|---|---|---|---|---|
| 4,641,017 A | * | 2/1987 | Lopata ................. | G07F 7/125 235/454 |
| 8,640,947 B1 | * | 2/2014 | Lewis ................ | G07F 19/2055 235/379 |

(Continued)

FOREIGN PATENT DOCUMENTS

WO     2009103136 A3     10/2009

*Primary Examiner* — Kerri L McNally
*Assistant Examiner* — Thang D Tran
(74) *Attorney, Agent, or Firm* — Graham Patent Law

(57) ABSTRACT

A card reader tampering detector includes at least one sensor and a detector circuit coupled to the sensor(s). The detector circuit is configured to receive a sensor output from the sensor(s) when the sensor is inserted into a smartcard reader. The detector circuit is further configured to detect, from the sensor output, the presence of an unauthorized device within the smartcard reader, and provide an output signal indicative of the presence of the unauthorized device within the smartcard reader.

20 Claims, 3 Drawing Sheets

Related U.S. Application Data

(60) Provisional application No. 62/507,781, filed on May 17, 2017.

(56) References Cited

U.S. PATENT DOCUMENTS

| | | | | |
|---|---|---|---|---|
| 8,695,879 | B1* | 4/2014 | Whytock | G06K 13/0881 235/449 |
| 9,010,647 | B2 | 4/2015 | Workley et al. | |
| 9,430,730 | B2 | 8/2016 | Chatterton et al. | |
| 9,578,763 | B1* | 2/2017 | Wade | G06F 21/86 |
| 9,892,293 | B1* | 2/2018 | Wade | G06K 7/10277 |
| 10,127,409 | B1* | 11/2018 | Wade | G06Q 20/30 |
| 2002/0002683 | A1* | 1/2002 | Benson | G06F 21/87 713/194 |
| 2004/0129772 | A1* | 7/2004 | Ramachandran | G07F 19/2055 235/379 |
| 2004/0141058 | A1* | 7/2004 | Ramachandran | G07F 19/207 348/150 |
| 2006/0049255 | A1* | 3/2006 | von Mueller | G06F 21/72 235/449 |
| 2006/0054700 | A1* | 3/2006 | May | G07F 19/2055 235/449 |
| 2007/0057070 | A1* | 3/2007 | Scarafile | G07F 19/20 235/475 |
| 2009/0101705 | A1* | 4/2009 | Jenkins | G06Q 40/00 235/379 |
| 2010/0012718 | A1* | 1/2010 | Griswold | G07F 19/20 235/379 |
| 2011/0135092 | A1* | 6/2011 | Lehner | G07F 19/2055 380/252 |
| 2013/0140363 | A1* | 6/2013 | Hart | G07F 19/2055 235/449 |
| 2014/0053256 | A1* | 2/2014 | Softer | H04W 12/0605 726/9 |
| 2014/0117094 | A1* | 5/2014 | Workley | G06K 19/0715 235/492 |
| 2014/0151449 | A1* | 6/2014 | Jenkins | G07F 19/2055 235/379 |
| 2014/0158768 | A1* | 6/2014 | Ray | H04K 3/825 235/449 |
| 2014/0217169 | A1* | 8/2014 | Lewis | G07F 19/20 235/379 |
| 2014/0372305 | A1* | 12/2014 | Ray | G07F 19/2055 705/44 |
| 2015/0097033 | A1* | 4/2015 | Yanko | H05K 1/0275 235/449 |
| 2015/0287289 | A1* | 10/2015 | Lewis | G07F 19/201 235/379 |
| 2016/0070939 | A1* | 3/2016 | Bytheway | G06F 21/86 235/438 |
| 2016/0171361 | A1* | 6/2016 | Chatterton | G06K 19/07372 705/41 |
| 2017/0061167 | A1* | 3/2017 | McNicoll | G06K 13/0875 |

* cited by examiner

CARD READER TAMPERING DETECTOR

CROSS-REFERENCE TO RELATED APPLICATIONS

This patent application is a continuation of U.S. patent application Ser. No. 15/982,963, filed May 17, 2018, and claims the benefit of priority under 35 U.S.C. § 119(e) of U.S. provisional application Ser. No. 62/507,781, filed May 17, 2017, the disclosures of which are incorporated herein by reference.

FIELD

This patent application relates to an apparatus for detecting tampering of card readers.

BACKGROUND

Bank machine terminals, transportation ticketing terminals, access control terminals and point-of-sale terminals typically use a card reader to allow a holder of an identification card to authenticate to the terminal. The identification card may be configured as a smartcard, and the card reader may be configured as a contact-based smartcard reader that includes electrical contacts arranged to engage respective electrical contact pads on the smartcard when the smartcard is inserted into the card reader. The card reader may receive confidential data from the smartcard via the electrical contacts/pads, and may pass the received confidential card data to the terminal for further processing.

The direct physical contact between the smartcard and the contact-based card reader limits the likelihood of the card data being intercepted by an unscrupulous third party and used for nefarious purposes. However, data skimming devices, commonly referred to as "shimmers", can be inserted into a contact-based card reader, and used to intercept and store the card data for subsequent retrieval by the third party.

Although card readers can detect when a smartcard is inserted in the card reader, shimmers are configured to prevent the card reader from detecting the presence of the shimmer, without interfering with the ability of the card reader to detect the presence of the smartcard and communicate with the card. Shimmers also have a very small physical profile and, therefore, are not easily viewed from outside the card reader.

SUMMARY

This patent application discloses a card reader tampering detector and associated method for detecting the presence of an authorized device installed in a contact-based smartcard reader.

In accordance with a first aspect of this disclosure, there is provided a card reader tampering detector that includes at least one sensor; and a detector circuit that is coupled to the at least one sensor. The detector circuit is configured to (i) receive a sensor output from the at least one sensor when the at least one sensor is inserted into a smartcard reader, (ii) from the sensor output detect a presence of an unauthorized device within the smartcard reader, and (iii) provide an output signal indicative of the presence of the unauthorized device within the smartcard reader.

The smartcard reader includes an interface that is configured to interface with a first smartcard contact pad of a smartcard when the smartcard is inserted into the smartcard reader. In one embodiment, the at least one sensor is disposed on a substrate, and the at least one sensor is disposed in proximity to the interface when the substrate is at least partially inserted into the smartcard reader.

The unauthorized device may include a first device electrical contact pin that is arranged to electrically engage the first smartcard contact pad when the smartcard is inserted into the smartcard reader, and the at least one sensor may include a first sensor electrical contact pad that is arranged to electrically engage the first device electrical contact pin. The detector circuit may be configured to apply a stimulus to the first sensor electrical contact pad and to detect the presence of the unauthorized device from the stimulus and from the sensor output received from the first sensor electrical contact pad.

The smartcard may include a second smartcard contact pad, the unauthorized device may include a second device electrical contact pin that is arranged to electrically engage the second smartcard contact pad when the smartcard is inserted into the smartcard reader, and the at least one sensor may include a second sensor electrical contact pad that is arranged to electrically engage the second device electrical contact pin. The detector circuit may be configured to apply a stimulus to the second sensor electrical contact pad and to detect the presence of the unauthorized device from the stimulus and from the sensor output received from the first sensor electrical contact pad.

In accordance with a second aspect of this disclosure, there is provided a method for detecting tampering of a smartcard reader that involves (i) inserting at least one sensor into a smartcard reader; (ii) receiving, at a detector circuit, a sensor output from the at least one sensor; (iii) from the sensor output, detecting, at the detector circuit, a presence of an unauthorized device within the smartcard reader; and (iv) generating, at the detector circuit, an output signal indicative of the presence of the unauthorized device within the smartcard reader.

In one embodiment, the smartcard reader includes an interface that is configured to interface with a first smartcard contact pad of a smartcard when the smartcard is inserted into the smartcard reader, and the inserting step involves disposing the at least one sensor in proximity to the interface.

The unauthorized device may include a first device electrical contact pin that is arranged to electrically engage the first smartcard contact pad when the smartcard is inserted into the smartcard reader, the at least one sensor may include a first sensor electrical contact pad, and the disposing step may involve electrically engaging the first sensor electronic contact pad with the first device electrical contact pin. The detecting step may involve (i) applying a stimulus signal to the first sensor electrical contact pad, and (ii) determining the presence of the unauthorized device from the stimulus and from the sensor output received from the first sensor electrical contact pad.

The smartcard may include a second smartcard contact pad, the unauthorized device may include a second device electrical contact pin that is arranged to electrically engage the second smartcard contact pad when the smartcard is inserted into the smartcard reader, and the at least one sensor may include a second sensor electrical contact pad that is arranged to electrically engage the second device electrical contact pin. The detecting step may involve (i) applying a stimulus to the second sensor electrical contact pad, and (ii) determining the presence of the unauthorized device from the stimulus and from the sensor output received from the first sensor electrical contact pad.

In one embodiment, the at least one sensor comprises an image sensor, and the detector circuit is configured with at least one reference image and detects the presence of the unauthorized device by (i) using the image sensor to capture at least one image of a card access port of the smartcard reader, and (ii) comparing the at least one captured image with the at least one reference image.

In one embodiment, the at least one sensor comprises an optical sensor, and the detector circuit is configured with a reference optical pattern and detects the presence of the unauthorized device by (i) using the optical sensor to measure illuminance at at least one location within a card access port of the smartcard reader, and (ii) comparing the measured illuminance with the reference optical pattern.

In one embodiment, the at least one sensor comprises an inductive sensor, and the detector circuit is configured with a reference inductive pattern and detects the presence of the unauthorized device by (i) using the inductive sensor to measure inductance at at least one location within a card access port of the smartcard reader, and (ii) comparing the measured inductance with the reference inductance pattern.

In one embodiment, the at least one sensor comprises an inductive switch, and the inductive switch is configured to signal the detector circuit that a distance between the at least one sensor and a metal artefact is less than a minimum proximity value.

As will become apparent, the card reader tampering detector provides the carrier thereof with an indication of the presence of an unauthorized device within a smartcard reader, without requiring reconfiguration of the smartcard reader and without damaging the smartcard reader.

BRIEF DESCRIPTION OF THE DRAWINGS

An exemplary card reader tampering detector will now be described, with reference to the accompanying drawings, in which.

DETAILED DESCRIPTION

Card Reader Skimming Environment

A contact-based smartcard includes a substantially rigid plastic substrate, a secure microprocessor and a plurality of electrical contact pads disposed on the upper surface of the plastic substrate. The secure microprocessor is electrically connected to the electrical contact pads, although one or more of the electrical contact pads are typically electrically isolated from the secure microprocessor.

In the following embodiment, the smartcard includes eight (8) electrical contact pads, and three (3) of the contact pads may be reserved for future use and, therefore, are electrically isolated from the secure microprocessor. However, it should be understood that the smartcard may have a different total number of electrical contact pads and/or a different number of reserved/electrically isolated contact pads.

A contact-based smartcard reader includes a card access port through which a contact-based smartcard may be inserted into, and removed from, the smartcard reader. A contact-based smartcard reader also includes a plurality of electrical contact pins each arranged to electrically and physically engage a respective electrical contact pad on the smartcard when the smartcard is fully inserted into the smartcard reader. However, where the smartcard reader is configured to interface with a smartcard that has contact pads that are electrically isolated from its secure microprocessor, the smartcard reader may be configured to ignore electrical signals received from those isolated smartcard pads or may lack the electrical circuitry required to allow the smartcard reader to receive electrical signals from those isolated smartcard pads.

Figure 1:
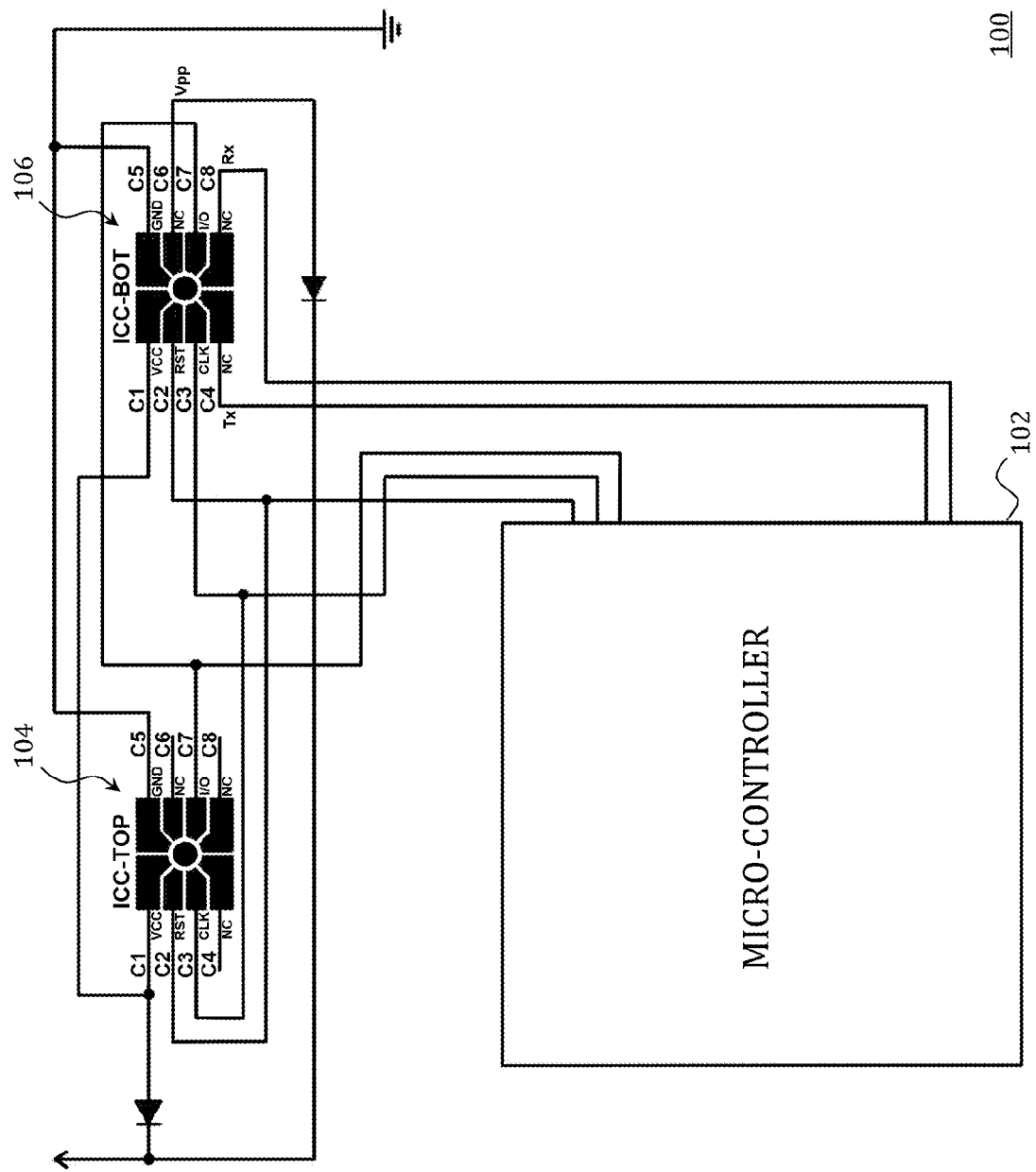
FIG. 1 is a schematic diagram of a sample card reader skimming device.

FIG. 1 depicts a sample unauthorized card reader skimming device, denoted generally as 100, that is configured to be received within the card access port of a contact-based smartcard reader. The skimming device (hereinafter "shimmer") 100 is typically provided as a flexible printed circuit device that includes a microcontroller 102, an upper electrical contact zone 104, and a lower electrical contact zone 106 all disposed on a flexible substrate.

The shimmer substrate is dimensioned to allow the shimmer 100 to be inserted into the card access port of the contact-based smartcard reader. Since the thickness of a smartcard (as established by ISO 7810) is approximately 0.76 mm, and the shimmer 100 must remain in the card access port of the smartcard reader without interfering with the movement of smartcards into and out from the smartcard reader, the shimmer substrate is typically a small fraction of the thickness of a smartcard.

The shimmer substrate may comprise an upper single-sided copper-coated polyimide film, a lower single-sided copper-coated polyimide film, and a thin flexible metal support layer sandwiched between the upper and lower polyimide films. Similar to conventional printed circuit boards, the copper-coated polyimide films are etched to leave a plurality of conductive copper traces that electrically interconnect the microcontroller 102 and the electrical contact zones 104, 106.

The flexible metal support layer includes at least one upright tab that prevents the shimmer 100 from being easily dislodged from the card access port of the smartcard reader after the shimmer 100 is inserted into card access port.

As shown in FIG. 1, the electrical contact zones 104, 106 each comprises a plurality of electrical contacts pins C1-C8 (hereinafter "device electrical contact pins"). The device electrical contact pins C1-C8 of the upper electrical contact zone 104 are disposed on the upper surface of the upper polyimide film, and the device electrical contact pins C1-C8 of the lower electrical contact zone 106 are disposed on the lower surface of the lower polyimide film.

The device electrical contact pins C1-C8 of the upper electrical contact zone 104 are each arranged to electrically and physically engage a corresponding electrical contact pin of the smartcard reader when the shimmer 100 is retained within the card access port of the card reader. Conversely, the device electrical contact pins C1-C8 of the lower electrical contact zone 106 are each arranged to electrically and physically engage a corresponding electrical contact pad on a smartcard when the smartcard is fully inserted into the smartcard reader.

Each device electrical contact pin of the upper electrical contact zone 104 is disposed directly below a respective device electrical contact pin of the lower electrical contact zone 106. Therefore, after the shimmer 100 is inserted/retained in the card access port of the smartcard reader, and a smartcard is subsequently fully inserted into the smartcard reader through the card access port, each electrical contact pad on the smartcard electrically and physically engages the corresponding device electrical contact pin of the lower electrical contact zone 106. Similarly, each device electrical contact pin of the upper electrical contact zone 104 electrically and physically engages the corresponding electrical contact pin of the smartcard reader.

The shimmer 100 receives electrical power from the smartcard reader via one of the device electrical contact pins of the upper electrical contact zone 104. Similarly, the smartcard, when fully inserted into the smartcard reader, receives electrical power from one of the device electrical contact pins of the lower electrical contact zone 106.

As shown in FIG. 1, the microcontroller 102 is electrically connected to the device electrical contact pins C1-C8 of the upper and lower electrical contact zones 104, 106. The microcontroller 102 includes a non-volatile memory, and is programmed with computer processing instructions that configure the microcontroller 102 to pass commands/data between a plurality of the device electrical contact pins C1-C8 of the upper electrical contact zone 104 and the corresponding device electrical contact pins of the lower electrical contact zone 106, and to save the commands/data in the non-volatile memory.

Since three (3) of the electrical contact pads of the smartcard (in this embodiment) are electrically isolated from the secure microprocessor, the corresponding three (3) device electrical contact pins (C4, C6, C8, in this embodiment) of the upper electrical contact zone 104 (collectively "secondary device electrical contact pins") are likewise electrically isolated from the microcontroller 102. However, to facilitate recovery of the commands/data from the non-volatile memory, the corresponding three (3) device electrical contact pins (C4, C6, C8) of the lower electrical contact zone 106 (collectively "secondary device electrical contact pins") are electrically connected to the microcontroller 102, and the computer processing instructions configure the microcontroller 102 to monitor for a memory read/access/dump command applied to the secondary device electrical contact pins of the lower electrical contact zone 106.

The computer processing instructions also configure the microcontroller 102 to monitor commands/data between the other five (5) device electrical contact pins (C1, C2, C3, C5, C7, in this embodiment) of the upper electrical contact zone 104 (collectively "primary device electrical contact pins") and the corresponding five (5) device electrical contact pins (C1, C2, C3, C5, C7, in this embodiment) of the lower electrical contact zone 106 ("primary device electrical contact pins"). Therefore, after the operator of the shimmer 100 inserts the shimmer 100 into the card access port of the smartcard reader, and a consumer subsequently fully inserts a smartcard into the smartcard reader, the microcontroller 102 monitors and parses commands/data exchanged between the smartcard reader and the smartcard via the five (5) primary device electrical contact pins of the upper electrical contact zone 104 and the five (5) primary device electrical contact pins of the lower electrical contact zone 106, and surreptitiously saves the commands/data in the non-volatile memory.

Thereafter, the operator of the shimmer 100 can recover the commands/data from the non-volatile memory by inserting a data extraction device into the card access port of the contact-based smartcard reader. The data extraction device transmits a memory read/access/dump command to the shimmer 100 via one or more of the secondary device electrical contact pins of the lower electrical contact zone 106.

After the shimmer 100 receives the memory read/access/dump command, the microcontroller 102 extracts the saved commands/data from the non-volatile memory, and transmits the extracted commands/data to the data recovery device via the secondary device electrical contact pins of the lower electrical contact zone 106.

For example, as shown in FIG. 1, device electrical contact pins C4, C8 of the lower electrical contact zone 106 may be respectively connected to a data output pin and a data input pin of the micro-controller 102. Therefore, the data extraction device may transmit the memory read/access/dump to the micro-controller 102 via the device electrical contact pin C8, and receive the stored commands/data from the shimmer 100 via the device electrical contact pin C4.

Card Reader Tampering detector

Figure 2:
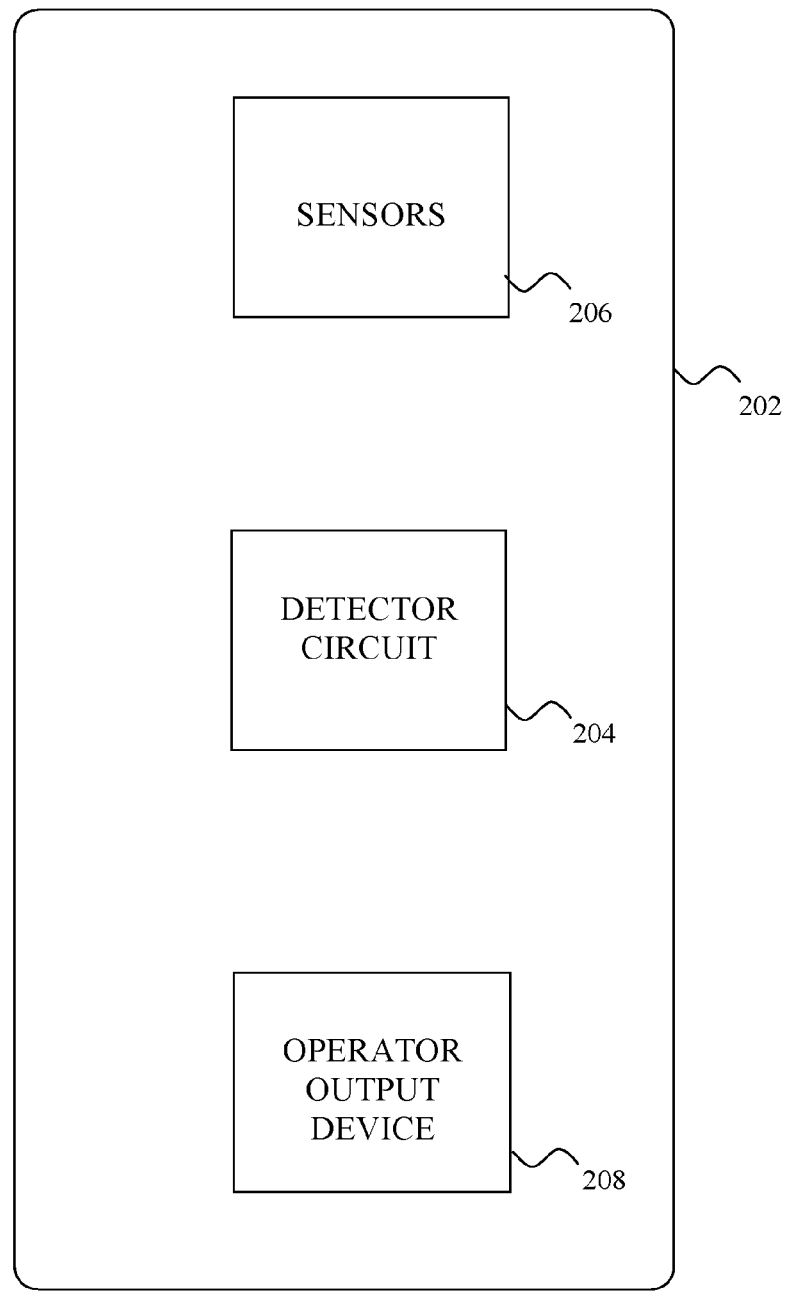
FIG. 2 is a top plan view of the card reader tampering detector, depicting the substrate, the sensor(s), the detector circuit and the optional operator output device.

FIG. 2 depicts one embodiment of a card reader tampering detector, denoted generally as 200, that is configured to detect the presence of a shimmer 100 within the card access port of a contact-based smartcard reader. The tampering detector 200 is typically provided as a printed circuit device that includes a substantially rigid substrate 202, a detector circuit 204, and at least one sensor 206 disposed on the substrate 202 and configured for communication with the detector circuit 204. Optionally, the tampering detector 200 may also include a light source (not shown), such as a light-emitting diode, that is disposed on the substrate 202 and is electrically interfaced with the detector circuit 204.

The tampering detector substrate 202 is dimensioned to facilitate at least partial insertion of the tampering detector 200 into the card access port of a contact-based smartcard reader. Without limiting the scope of the tampering detector 200, the tampering detector substrate 202 may comprise one or more copper layers laminated to an insulating layer. The copper layer(s) may be etched to leave a plurality of conductive copper traces that electrically interconnect the detector circuit 204 and the sensor(s) 206. As noted above, the thickness of a smartcard (as established by ISO 7810) is approximately 0.76 mm. Therefore, the thickness of the tampering detector substrate 202 may be commensurate with that of a smartcard.

The detector circuit 204 is configured to (i) receive a sensor output from the sensor(s) 206, (ii) from the sensor output detect a presence of an unauthorized device within the smartcard reader when the tampering detector 200 is at least partially inserted in the smartcard reader, and (iii) provide an output signal indicative of the presence of the unauthorized device within the smartcard reader.

Without limiting the scope of the tampering detector 200, the detector circuit 204 may be implemented, for example, as a microcontroller programmed with computer processing instructions, a programmable gate array, a programmable logic array, a programmable logic device, or an application-specific integrated circuit.

In the embodiment shown, the detector circuit 204 is disposed on the tampering detector substrate 202. However, in one variation, the detector circuit 204 is provided in a communications device that is separate from the substrate 202. Therefore, the detector circuit 204 may be disposed on a computing device, for example, that is located remotely from the substrate 202, and configured to communicate with the sensor(s) 206 via a wired, optical or wireless communications.

The sensor(s) 206 is positioned on the substrate 202 such that, when the tampering detector 200 is at least partially inserted into the card access port of the smartcard reader, the sensor(s) 206 aligns with a region of the smartcard reader normally occupied by a smartcard when the smartcard is inserted in the smartcard reader. Without limiting the scope of the tampering detector 200, the sensor(s) 206 may be implemented, for example, as an image sensor (e.g. a charge-coupled device (CCD) image sensor), a light sensor (e.g. Avago APDS-9960 Digital Proximity, Ambient Light, RGB and Gesture Sensor), an inductive sensor, an inductive switch (e.g. a Texas Instrument LDC0851 Differential Inductive Switch), an electrical sensor, or a combination of two or more thereof.

Therefore, for example, where the sensor(s) 206 are implemented as image sensors, and the tampering detector 200 includes a light source, the detector circuit 204 may detect the presence of a shimmer 100 within the smartcard reader by optionally illuminating the card access port in the visible or invisible spectra using the light source, capturing images of one or more artefacts of the card access port via the image sensors 206, and comparing the image artefacts against those expected to be obtained from an uncompromised smartcard reader. This comparison may positively detect a shimmer 100 where, for example, the detector circuit 204 is configured with images of various features of an uncompromised smartcard reader ("reference images"), and the shimmer substrate obstructs or otherwise alters one or more artefacts of the card access port such that the image(s) captured by the image sensor(s) within the card access port in the presence of the shimmer 100 do not correspond with the reference images.

Similarly, where the sensor(s) 206 are implemented as light sensors, and the tampering detector 200 includes a light source, the detector circuit 204 may detect the presence of a shimmer 100 within the smartcard reader by optionally illuminating the card access port in the visible or invisible spectra using the light source, measuring the illuminance at one or more locations within the card access port via the light sensors 206, and comparing the illuminance measurement(s) against values expected to be obtained from an uncompromised smartcard reader. This comparison may positively detect a shimmer 100 where, for example, the detector circuit 204 is configured with an array of illuminance measurements (e.g. position co-ordinates of each light sensor 206 relative to the substrate 202, and illuminance magnitude value measured by each light sensor 206 at the respective position co-ordinates) generated from an uncompromised smartcard reader illuminated by the light source ("reference optical pattern"), and the proximity of the shimmer substrate causes greater reflection than expected such that the illuminance magnitude value(s) measured by the optical sensor(s) at their respective positions in the presence of the shimmer 100 do not correspond with the reference optical pattern.

Where the sensor(s) 206 are implemented as inductive sensors, and the tampering detector 200 receives electrical power from a battery that is mounted, for example, on the tampering detector substrate 202, the detector circuit 204 may detect the presence of a shimmer 100 within the smartcard reader by measuring the change in inductance at one or more locations within the card access port as the tampering detector 200 is being inserted into the card access port, and comparing the inductance measurement(s) against values expected to be obtained from inserting the tampering detector 200 into an uncompromised smartcard reader. This comparison may positively detect a shimmer 100 where, for example, the detector circuit 204 is configured with an array of inductance measurements (e.g. position co-ordinates of each inductive sensor 206 relative to the substrate 202, and a change in inductance value measured by each inductive sensor 206 at the respective position co-ordinates) generated by inserting a tampering detector 200 into an uncompromised smartcard reader ("reference inductance pattern"), and the permeability of the metal support layer of the shimmer substrate is large relative to that of the smartcard reader such that the change(s) in inductance value(s) measured by the inductive sensor(s) at their respective positions in the presence of the shimmer 100 do not correspond with the reference inductance pattern.

Where the sensor(s) 206 are implemented as inductive switches, the inductive switch 206 may be configured to generate an output signal when a change in inductance proximate the inductive switch 206 exceeds a threshold value. After the tampering detector 200 is inserted into the card access port, the detector circuit 204 may detect the presence of a shimmer 100 within the smartcard reader upon receipt of a signal from any of the inductive switches 206 indicating that the change in inductance proximate the respective inductive switch 206 has exceeded the threshold value. This comparison may positively detect a shimmer 100 where, for example, each inductive switch 206 is configured to generate an output signal when the distance between the respective inductive switch 206 and a metal artefact is less than that expected from inserting the tampering detector 200 into an uncompromised smartcard reader ("minimum proximity value"); and the distance between the shimmer 100 and the tampering detector 200, after the tampering detector 200 is inserted into the card access port, is less than the minimum proximity value.

Where the sensor(s) 206 are implemented as electrical sensors (e.g. a resistance sensor), the detector circuit 204 can detect the presence of a shimmer 100 within the smartcard reader by measuring the resistance, for example, at one or more locations within the card access port, and comparing the resistance measurement(s) against values expected to be obtained from an uncompromised smartcard reader. This comparison may positively detect a shimmer 100 where, for example, an uninsulated region of the metal support layer of the shimmer substrate coincides with the location of one of the sensor(s) 206.

The tampering detector 200 may also include an operator output device 208, electrically coupled to the detector circuit 204, for providing the operator of the tampering detector 200 with an audible and/or visual representation of the output signal (indicative of the presence of the unauthorized device within the smartcard reader) received from the detector circuit 204. The detector circuit 204 may be configured to vary the output signal to the operator output device 208 based on the likelihood of an unauthorized device being disposed within the smartcard reader.

Without limiting the scope of the tampering detector 200, the operator output device 208 may comprise a vibrator, speaker, display device, or a combination of two or more thereof. In one implementation, the display device comprises a series of light emitting diodes (LEDs), and the detector circuit 204 is configured to increase the number of illuminated LEDs as the likelihood of an unauthorized device being disposed within the smartcard reader increases.

In the embodiment shown, the operator output device 208 is disposed on the tampering detector substrate 202. However, in one variation, the operator output device 208 (and the detector circuit 204) are provided in a communications device that is separate from the substrate 202. Therefore, the operator output device 208 may be integrated into a computing device, for example, that is located remotely from the substrate 202.

In the embodiment shown in FIG. 3, the electrical sensors of the sensor 206 are configured as a plurality of electrical contacts pads 206.1-206.8 (hereinafter "detector electrical contact pads") disposed on one surface of the tampering detector substrate 202. The detector electrical contact pads 206.1-206.8 are each arranged to electrically and physically engage a corresponding device electrical contact pin of the lower electrical contact zone 106 of the shimmer 100 when the tampering detector 200 is at least partially inserted into the card access port of the smartcard reader.

Where the detector circuit 204 is disposed on the tampering detector substrate 202, a battery may be mounted on the tampering detector substrate 202 to provide electrical power to the detector circuit 204. Alternately, the detector circuit 204 may receive electrical power from the shimmer 100 via the device electrical contact pins of the lower electrical contact zone 106 of the shimmer 100 when the tampering detector 200 is at least partially inserted into the card access port of the smartcard reader. In this latter variation, where no shimmer 100 has been inserted in the smartcard reader, the detector circuit 204 may receive power from the corresponding pins of the smartcard reader.

Where the detector circuit 204 is provided in a communications device that is separate from the substrate 202, the detector circuit 204 may receive power from the communications device, the battery, the shimmer 100 or the smartcard reader, as appropriate.

As noted above, three (3) of the electrical contact pads of a smartcard (in this embodiment) may be electrically isolated from the secure microprocessor thereof, and the corresponding three (3) secondary device electrical contact pins of the lower electrical contact zone 106 (C4, C6, C8 in this embodiment) are electrically connected to the microcontroller 102. Therefore, in the embodiment shown in FIG. 3, the detector circuit 204 may detect the presence of a shimmer 100 within the smartcard reader (when the tampering detector 200 is at least partially inserted in the smartcard reader) from a signal received from one or more of the secondary device electrical contact pins of the lower electrical contact zone 106.

For example, the microcontroller 102 of the shimmer 100 may include a driver circuit that is connected to one or more of the secondary device electrical contact pins (C4, C6, C8 in this embodiment) of the lower electrical contact zone 106, and the detector circuit 204 may detect the presence of a shimmer 100 within the smartcard reader by measuring one or more electrical characteristics at one or more of the detector electrical contact pads (e.g. detector electrical contact pads 206.4, 206.6, 206.8) that are electrically and physically engaged with those secondary device electrical contact pins, and comparing the electrical characteristic measurement(s) against values expected to be obtained from the corresponding electrical contact pin(s) of an uncompromised smartcard reader.

Figure 3:
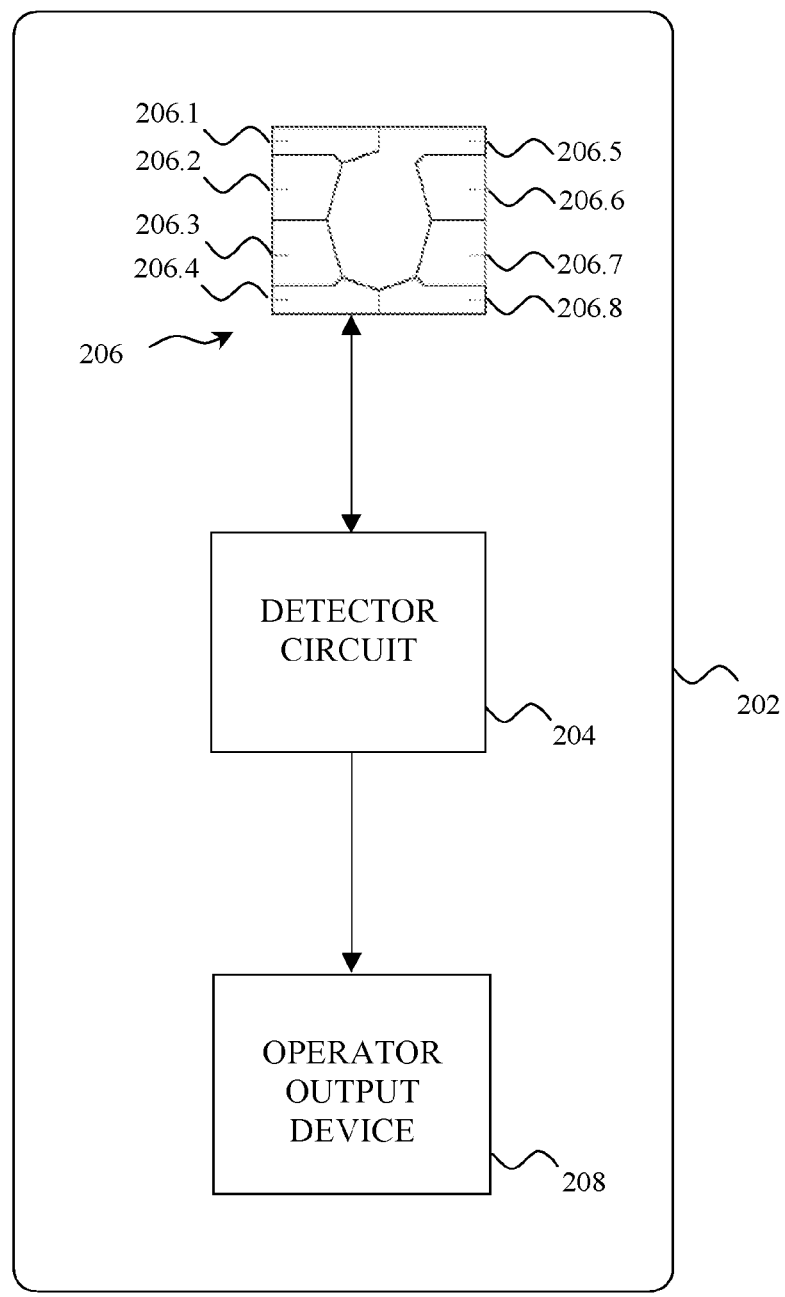
FIG. 3 is a schematic diagram of the card reader tampering detector, depicting the sensor(s), the detector circuit, and the optional operator output device.

Alternately, in the embodiment shown in FIG. 3, the detector circuit 204 may apply a stimulus to one or more of the secondary device electrical contact pins of the lower electrical contact zone 106 (when the tampering detector 200 is at least partially inserted in the smartcard reader), and may detect a shimmer 100 within the smartcard reader from the applied stimulus and from a signal received from the one secondary device electrical contact pin of the lower electrical contact zone 106.

For example, the detector circuit 204 may apply a voltage to one or more of the secondary device electrical contact pins (C4, C6, C8 in this embodiment) of the lower electrical contact zone 106 (via the detector electrical contact pads (e.g. detector electrical contact pads 206.4, 206.6 or 206.8) that are electrically and physically engaged with those secondary device electrical contact pins of the lower electrical contact zone 106). The detector circuit 204 may then detect the presence of a shimmer 100 within the smartcard reader by measuring the resulting current draw at the same detector electrical contact pad (e.g. detector electrical contact pad 206.4, 206.6 or 206.8), and comparing the current measurement(s) against values expected to be obtained from the corresponding electrical contact pin(s) of an uncompromised smartcard reader.

In each of these latter two examples, the detector circuit 204 may notify the operator of the tampering detector 200 that the measurements differ from the expected values by, for example, activating the vibrator, generating a tone via the speaker, or activating the display device of the operator output device 208. The detector circuit 204 may also alter the vibration intensity, tone, or display intensity at the operator output device 208 based on the magnitude of the deviation of the measurements from the expected values.

As noted above, the shimmer 100 may be configured to dump the commands/data (stored in the non-volatile memory thereof) via one or more of the secondary device electrical contact pins of the lower electrical contact zone 106 in response to a memory dump command received over those one or more secondary device electrical contact pins. Therefore, in the embodiment shown in FIG. 3, the detector circuit 204 may be implemented as a microcontroller programmed with computer processing instructions that configure the detector circuit 204 to apply one or more commands to one of the secondary device electrical contact pins of the lower electrical contact zone 106, and to detect the presence of the shimmer 100 from a signal received from another of the secondary device electrical contact pins of the lower electrical contact zone 106.

For example, the detector circuit 204 may be configured with instruction sets for a plurality of microcontrollers that might be used in a shimmer 100, and may select one or more memory read/access/dump commands from the instruction sets, and apply the read/access/dump command(s) to one of the secondary device electrical contact pins of the lower electrical contact zone 106 (via the detector electrical contact pad (e.g. detector electrical contact pad 206.4, 206.6 or 206.8) that is electrically and physically engaged with the one secondary device electrical contact pins of the lower electrical contact zone 106). The detector circuit 204 may then detect the presence of a shimmer 100 within the smartcard reader by monitoring for data received, in response to the applied command(s), at a detector electrical contact pad (e.g. detector electrical contact pad 206.4, 206.6 or 206.8) that is electrically and physically engaged with another of the secondary device electrical contact pins of the lower electrical contact zone 106.

Since the function of the microcontroller pins that are connected to the secondary device electrical contact pins of the lower electrical contact zone 106 may differ between microcontrollers, the detector circuit 204 may also apply the read/access/dump command(s), in succession, to each detector electrical contact pad (e.g. detector electrical contact pad 206.4, 206.6, 206.8) that is electrically and physically engaged with the secondary device electrical contact pin of the lower electrical contact zone 106, and monitor for data received at each detector electrical contact pad (e.g. detector electrical contact pad 206.4, 206.6 or 206.8) that is electrically and physically engaged with another of the secondary device electrical contact pins of the lower electrical contact zone 106.

Since the detector circuit 204 sends memory read/access/dump commands to the shimmer 100 (if present) in these latter two examples, the detector circuit 204 may detect the presence of the shimmer 100 within the smartcard reader if the tampering detector 200 receives any electrical activity over the detector electrical contact pads (e.g. detector electrical contact pad 206.4, 206.6 or 206.8) that are electrically and physically engaged with the secondary device electrical contact pins of the lower electrical contact zone 106. The detected electrical activity may be all or part of the data that is stored in the shimmer 100 and that is transmitted by the shimmer 100 in response to the command(s) applied by the tampering detector 200. Alternately, or additionally, the detected electrical activity may be one or more signals that are generated by the shimmer 100 prior to transmitting the stored data.

For example, the shimmer 100 may be configured to apply a voltage to one or more serial communications pins (e.g. a transmit (Tx) and/or receive (Rx) pin) after the shimmer 100 receives electrical power from the smartcard reader. The detector circuit 204 may detect the presence of the shimmer 100 from the presence of the applied voltage at any of the detector electrical contact pads 206.4, 206.6 or 206.8. Alternately, or additionally, the shimmer 100 may be configured to establish a serial communications channel with the data extraction device prior to the shimmer 100 transmitting its stored data to the data extraction device. The shimmer 100 may establish the serial communications channel by, for example, transmitting a series of synchronization characters to the data extraction device. Accordingly, the detector circuit 204 may detect the presence of the shimmer 100 from the presence of one or more synchronization characters at any of the detector electrical contact pads 206.4, 206.6 or 206.8.

In each of these latter two examples, the detector circuit 204 may notify the operator of the tampering detector 200 that the detector circuit 204 received data over those detector electrical contact pads by, for example, activating the vibrator, generating a tone via the speaker, or activating the display device of the operator output device 208.

Alternately, the tampering detector 200 will typically receive a minimal (if any) response, over those detector electrical contact pads (e.g. detector electrical contact pad 206.4, 206.6 or 206.8), if the detector circuit 204 does not send the correct read/access/dump command(s) to the shimmer 100 or if no shimmer 100 is installed in the smartcard reader. In contrast, the tampering detector 200 will receive from the shimmer 100 a complete dump of all the commands/data stored in the shimmer 100 if the detector circuit 204 sends the correct read/access/dump command(s) to the shimmer 100. Therefore, the detector circuit 204 may alter the vibration intensity, tone, or display intensity at the operator output device 208 based on the response received to the commands(s) and/or the magnitude of the data received, over the detector electrical contact pads (e.g. detector electrical contact pad 206.4, 206.6 or 206.8) that are electrically and physically engaged with the secondary device electrical contact pins of the lower electrical contact zone 106.

In each of foregoing examples, the tests performed by the tampering detector 200 fell within a single test class (e.g. illuminance measurement(s), inductance measurement(s), proximity measurement(s), voltage measurement(s), current measurement(s), monitoring for response data from read/access/dump command(s)), and the tampering detector 200 detects the presence of a shimmer 100 within the smartcard reader from the data obtained from the test class. In one variation, the tests performed by the tampering detector 200 fall within a plurality of the foregoing test classes, and the tampering detector 200 detects the presence of a shimmer 100 within the smartcard reader by weighting the results of the tests performed.

For example, the detector circuit 204 may be configured to weight a data dump received over the detector electrical contact pads more heavily than a deviation in voltage/current/illuminance/proximity/inductance measurements. The detector circuit 204 might be configured to weigh a deviation in voltage/current measurements more heavily than a deviation in illuminance/inductance measurements.

From the various weighted results, the detector circuit 204 might determine the probability that a shimmer 100 has been inserted in smartcard reader.

For example, the detector circuit 204 might calculate a probability of detection factor p by summing the various weighted test results, and scaling the weighted sum, as follows:

$$\text{weighted sum} = \omega_1 * M + \omega_2 * \Delta V + \omega_3 * \Delta I + \omega_4 * \Delta E + \omega_5 * \Delta L + \omega_6 * \Delta P$$

$$p = \text{weighted sum/maximum possible value of weighted sum}$$

where:
p=probability of a shimmer inserted in smartcard reader;
$\omega_1, \omega_2, \omega_3, \psi_4, \omega_5, \omega_6$ are weight factors;
M=0 if the response received to applied stimuli differs from the expected response or if the size of the received data block is less than a threshold minimum value characteristic of a data dump from a shimmer;
M=1 if the response received to applied stimuli corresponds to the expected response or if the size of the received data block exceeds the threshold minimum value;
$\Delta V$=difference between measured voltage and expected voltage;
$\Delta I$=difference between measured current and expected current;
$\Delta E$=difference between measured illuminance and expected illuminance;
$\Delta L$=difference between measured inductance change and expected inductance change;
$\Delta P$=difference between measured proximity threshold and expected proximity threshold.

The detector circuit 204 might then alter the vibration intensity, tone, or display intensity at the operator output device 208 based on the calculated value of the probability of detection factor p.

The invention claimed is:

1. A card reader tampering detector comprising:
   at least one sensor; and
   a detector circuit coupled to the at least one sensor and configured to (i) receive a sensor output from the at least one sensor when the at least one sensor is inserted into a smartcard reader, (ii) from the sensor output detect a presence of an unauthorized device within the smartcard reader, and (iii) provide an output signal indicative of the presence of the unauthorized device within the smartcard reader.

2. The tampering detector according to claim 1, wherein the smartcard reader includes an interface configured to interface with a first smartcard contact pad of a smartcard when the smartcard is inserted into the smartcard reader, the at least one sensor is disposed on a substrate, and the at least one sensor is disposed in proximity to the interface when the substrate is at least partially inserted into the smartcard reader.

3. The tampering detector according to claim 2, wherein the unauthorized device includes a first device electrical contact pin arranged to electrically engage the first smartcard contact pad when the smartcard is inserted into the smartcard reader, and the at least one sensor comprises a first sensor electrical contact pad arranged to electrically engage the first device electrical contact pin.

4. The tampering detector according to claim 3, wherein the detector circuit is configured to apply a stimulus to the first sensor electrical contact pad and to detect the presence of the unauthorized device from the stimulus and from the sensor output received from the first sensor electrical contact pad.

5. The tampering detector according to claim 3, wherein the smartcard includes a second smartcard contact pad, the unauthorized device includes a second device electrical contact pin arranged to electrically engage the second smartcard contact pad when the smartcard is inserted into the smartcard reader, the at least one sensor comprises a second sensor electrical contact pad arranged to electrically engage the second device electrical contact pin, and the detector circuit is configured to apply a stimulus to the second sensor electrical contact pad and to detect the presence of the unauthorized device from the stimulus and from the sensor output received from the first sensor electrical contact pad.

6. The tampering detector according to claim 1, wherein the at least one sensor comprises at least two of an electrical sensor, an image sensor, an optical sensor, an inductive sensor, and an inductive switch.

7. The tampering detector according to claim 1, wherein the at least one sensor comprises an image sensor, and the detector circuit is configured with at least one reference image and is further configured to detect the presence of the unauthorized device by (i) using the at least one sensor to capture at least one image of a card access port of the smartcard reader, and (ii) comparing the at least one captured image with the at least one reference image.

8. The tampering detector according to claim 1, wherein the at least one sensor comprises an optical sensor, and the detector circuit is configured with a reference optical pattern and is further configured to detect the presence of the unauthorized device by (i) using the at least one sensor to measure illuminance at at least one location within a card access port of the smartcard reader, and (ii) comparing the measured illuminance with the reference optical pattern.

9. The tampering detector according to claim 1, wherein the at least one sensor comprises an inductive sensor, and the detector circuit is configured with a reference inductance pattern and is further configured to detect the presence of the unauthorized device by (i) using the at least one sensor to measure inductance at at least one location within a card access port of the smartcard reader, and (ii) compare the measured inductance with the reference inductance pattern.

10. The tampering detector according to claim 1, wherein the at least one sensor comprises an inductive switch, and the inductive switch is configured to signal the detector circuit that a distance between the at least one sensor and a metal artefact is less than a minimum proximity value.

11. The tampering detector according to claim 1, further comprising an operator output device coupled to the detector circuit and configured to provide one of an audible and a visual representation of the output signal received from the detector circuit.

12. A method for detecting tampering of a smartcard reader, the method comprising:
inserting at least one sensor into a smartcard reader;
receiving, at a detector circuit, a sensor output from the at least one sensor;
from the sensor output, detecting, at the detector circuit, a presence of an unauthorized device within the smartcard reader; and
generating, at the detector circuit, an output signal indicative of the presence of the unauthorized device within the smartcard reader.

13. The method according to claim 12, wherein the smartcard reader includes an interface configured to interface with a first smartcard contact pad of a smartcard when the smartcard is inserted into the smartcard reader, and the inserting comprises disposing the at least one sensor in proximity to the interface.

14. The method according to claim 13, wherein the unauthorized device includes a first device electrical contact pin arranged to electrically engage the first smartcard contact pad when the smartcard is inserted into the smartcard reader, the at least one sensor comprises a first sensor electrical contact pad, and the disposing comprises electrically engaging the first sensor electronic contact pad with the first device electrical contact pin.

15. The method according to claim 14, wherein the detecting comprises (i) applying a stimulus signal to the first sensor electrical contact pad, and (ii) determining the presence of the unauthorized device from the stimulus and from the sensor output received from the first sensor electrical contact pad.

16. The method according to claim 14, wherein the smartcard includes a second smartcard contact pad, the unauthorized device includes a second device electrical contact pin arranged to electrically engage the second smartcard contact pad when the smartcard is inserted into the smartcard reader, the at least one sensor comprises a second sensor electrical contact pad arranged to electrically engage the second device electrical contact pin, and the detecting comprises (i) applying a stimulus to the second sensor electrical contact pad, and (ii) determining the presence of the unauthorized device from the stimulus and from the sensor output received from the first sensor electrical contact pad.

17. The method according to claim 12, wherein the at least one sensor comprises an image sensor, and the detecting comprises (i) capturing at least one image of a card access port of the smartcard reader, via the image sensor, and (ii) comparing the at least one captured image with at least one reference image.

18. The method according to claim 12, wherein the at least one sensor comprises an optical sensor, and the detecting comprises (i) measuring illuminance at at least one location within a card access port of the smartcard reader, via the optical sensor, and (ii) comparing the measured illuminance with a reference optical pattern.

19. The method according to claim 12, wherein the at least one sensor comprises an inductive sensor, and the detecting comprises (i) measuring inductance at at least one location within a card access port of the smartcard reader, via the inductive sensor, and (ii) comparing the measured inductance with a reference inductance pattern.

20. The method according to claim 12, wherein the at least one sensor comprises an inductive switch, and the detecting comprises determining, via the inductive switch, that a distance between the at least one sensor and a metal artefact is less than a minimum proximity value.

* * * * *